US012003815B2

(12) United States Patent
Horton et al.

(10) Patent No.: US 12,003,815 B2
(45) Date of Patent: *Jun. 4, 2024

(54) SET-TOP BOX FOR CHANGING CHANNELS AND SYSTEM AND METHOD FOR USE OF SAME

(71) Applicant: Enseo, LLC, Plano, TX (US)

(72) Inventors: Raymond S. Horton, McKinney, TX (US); William C. Fang, Plano, TX (US)

(73) Assignee: Enseo, LLC, Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/318,571

(22) Filed: May 16, 2023

(65) Prior Publication Data
US 2023/0291969 A1 Sep. 14, 2023

Related U.S. Application Data

(63) Continuation of application No. 17/104,818, filed on Nov. 25, 2020, now Pat. No. 11,653,060, which is a
(Continued)

(51) Int. Cl.
H04N 21/442 (2011.01)
H04N 5/50 (2006.01)
H04N 21/40 (2011.01)
H04N 21/41 (2011.01)
H04N 21/426 (2011.01)
H04N 21/438 (2011.01)
H04N 21/44 (2011.01)

(52) U.S. Cl.
CPC ......... H04N 21/44222 (2013.01); H04N 5/50 (2013.01); H04N 21/40 (2013.01);
(Continued)

(58) Field of Classification Search
CPC ......... H04N 21/4384; H04N 21/44004; H04N 21/6125; H04N 21/44016;
(Continued)

(56) References Cited

U.S. PATENT DOCUMENTS 5,933,192 A 8/1999 Crosby et al.
6,208,271 B1 3/2001 Armstrong
(Continued)

Primary Examiner — Jason Salce
(74) Attorney, Agent, or Firm — Scott Griggs; Griggs Bergen LLP

(57) ABSTRACT

A set-top box for changing channels and method for use of the same are disclosed. In one embodiment, the set-top box includes a network interface controller that is configured to receive a source internet protocol television signal, which includes two channels, from an external source and at least partially prepare the source internet protocol signal in order to forward the tuned signal to a television. The set-top box saves in a buffer the at least partially prepared second channel beginning at a recent periodic, sequential signal access point. In response to receiving a channel change instruction when the set-top box is forwarding the at least partially prepared first channel signal, the set-top box causes the television tuner to forward the at least partially prepared signal based on the second channel stored in the buffer beginning at the recent periodic, sequential signal access point.

20 Claims, 4 Drawing Sheets

Related U.S. Application Data continuation of application No. 16/752,131, filed on Jan. 24, 2020, now Pat. No. 10,863,237, which is a continuation of application No. 15/281,681, filed on Sep. 30, 2016, now Pat. No. 10,547,904, which is a continuation-in-part of application No. 14/811,585, filed on Jul. 28, 2015, now abandoned.

(60) Provisional application No. 62/371,486, filed on Aug. 5, 2016, provisional application No. 62/029,781, filed on Jul. 28, 2014.

(52) U.S. Cl.
CPC ........... *H04N 21/41* (2013.01); *H04N 21/426* (2013.01); *H04N 21/42607* (2013.01); *H04N 21/42615* (2013.01); *H04N 21/42623* (2013.01); *H04N 21/4263* (2013.01); *H04N 21/4384* (2013.01); *H04N 21/44004* (2013.01)

(58) Field of Classification Search
CPC ....... H04N 21/26616; H04N 21/23424; H04N 5/50; H04N 21/2385
See application file for complete search history.

(56) References Cited

U.S. PATENT DOCUMENTS

| | | |
|---|---|---|
| 7,237,251 B1 | 6/2007 | Oz et al. |
| 7,457,075 B2 | 11/2008 | Liu et al. |
| 7,890,983 B2 | 2/2011 | Chen et al. |
| 10,547,904 B2 | 1/2020 | Horton et al. |
| 10,863,237 B2 | 12/2020 | Horton et al. |
| 11,653,060 B2 * | 5/2023 | Horton ............. H04N 21/42607 725/142 |
| 2001/0005905 A1 | 6/2001 | Saib et al. |
| 2002/0083446 A1 | 6/2002 | Eaton |
| 2002/0113895 A1 | 8/2002 | Takagi et al. |
| 2004/0133910 A1 | 7/2004 | Gordon et al. |
| 2006/0075428 A1 | 4/2006 | Farmer et al. |
| 2006/0230176 A1 | 10/2006 | Dacosta |
| 2006/0277582 A1 | 12/2006 | Kiiskinen et al. |
| 2010/0223653 A1 | 9/2010 | Koppelaar et al. |
| 2010/0329355 A1 | 12/2010 | Pandey et al. |
| 2011/0107379 A1 | 5/2011 | Lajoie |
| 2011/0167444 A1 | 7/2011 | Sun |
| 2013/0002887 A1 | 1/2013 | Bruce-Smith |
| 2014/0189739 A1 | 7/2014 | Kummer |
| 2016/0029078 A1 | 1/2016 | Ogle et al. |
| 2021/0084371 A1 | 3/2021 | Horton et al. |

* cited by examiner

SET-TOP BOX FOR CHANGING CHANNELS AND SYSTEM AND METHOD FOR USE OF SAME

PRIORITY STATEMENT & CROSS-REFERENCE TO RELATED APPLICATIONS

This application is a continuation of U.S. patent application Ser. No. 17/104,818 entitled "Set-Top Box for Changing Channels and System and Method for Use of Same" filed on Nov. 25, 2020 in the names of Raymond S. Horton, et al., now U.S. Pat. No. 11,653,060, issued on May 16, 2023; which is a continuation of U.S. patent application Ser. No. 16/752,131 entitled "Set-Top Box for Changing Channels and System and Method for Use of Same" filed on Jan. 24, 2020, in the names of Raymond S. Horton, et al., now U.S. Pat. No. 10,863,237, issued on Dec. 8, 2020; which is a continuation of Ser. No. 15/281,681 entitled "Set-Top Box for Changing Channels and System and Method for Use of Same" filed on Sep. 30, 2016, in the names of Raymond S. Horton et al., now U.S. Pat. No. 10,547,904, issued on Jan. 28, 2020; which claims priority from U.S. Patent Application Ser. No. 62/371,486 entitled "Set-Top Box for Changing Channels and System and Method for Use of Same" filed on Aug. 5, 2016, in the names of Raymond S. Horton et al. U.S. patent application Ser. No. 15/281,681 entitled "Set-Top Box for Changing Channels and System and Method for Use of Same" filed on Sep. 30, 2016, in the names of Raymond S. Horton et al., now U.S. Pat. No. 10,547,904, issued on Jan. 28, 2020, is also a continuation-in-part of U.S. application Ser. No. 14/811,585 entitled "Set-Top Box for Changing Channels and System and Method for Use of Same" filed on Jul. 28, 2015, in the names of Raymond S. Horton et al.; which claims priority from U.S. Patent Application Ser. No. 62/029,781 entitled "Set-Top Box for Changing Channels and System and Method for Use of Same" filed on Jul. 28, 2014, in the name of Vanessa Ogle; all of which are hereby incorporated, in entirety, by reference for all purposes.

TECHNICAL FIELD OF THE INVENTION

This invention relates, in general, to set-top boxes and, in particular, to set-top boxes for changing channels and systems and methods for use of the same that address the total duration of time from a channel change button being pressed to the new channel being displayed.

BACKGROUND OF THE INVENTION

Without limiting the scope of the present invention, the background will be described in relation to televisions in the hospitality lodging industry, as an example. "Zap time" is the total duration of time from a television viewer pressing the channel change button, to the picture of the new channel being displayed with full resolution, along with corresponding audio. Zap time delays exist in all television systems, due to network factors, acquisition factors and buffering/decoding, for example. Zap time is greater in digital televisions, however, which are very common in hotels and other hospitality lodging establishments. As a result of limitations in existing technology, zap time is a frequent complaint and source of aggravation by guests staying in hospitality lodging establishments. Accordingly, there is a need for improved systems and methods for mitigating zap time delays.

SUMMARY OF THE INVENTION

It would be advantageous to reduce zap time in hospitality lodging establishments as well as any television viewing environment. It would also be desirable to enable a computer-based solution that would mitigate tuning-related factors, such as buffering and decryption delays. To better address one or more of these concerns, a set-top box for changing channels and systems and methods for use of the same are disclosed. In one embodiment, the set-top box includes a network interface controller that is configured to receive a source internet protocol television signal, which includes at least first and second channels, from an external source and at least partially prepare the source internet protocol signal in order to forward the tuned signal to a television. Within the set-top box, memory is accessible to the processor such that processor-executable instructions, when executed, cause the processor to save in a buffer the at least partially prepared second channel beginning at a recent periodic, sequential signal access point. In response to receiving a channel change instruction when the set-top box is forwarding the at least partially prepared first channel signal, the set-top box causes the television tuner to forward the at least partially prepared signal based on the second channel stored in the buffer beginning at the recent periodic, sequential signal access point. These and other aspects of the invention will be apparent from and elucidated with reference to the embodiments described hereinafter.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which.

DETAILED DESCRIPTION OF THE INVENTION

While the making and using of various embodiments of the present invention are discussed in detail below, it should be appreciated that the present invention provides many applicable inventive concepts, which can be embodied in a wide variety of specific contexts. The specific embodiments discussed herein are merely illustrative of specific ways to make and use the invention, and do not delimit the scope of the present invention.

Figure 1:
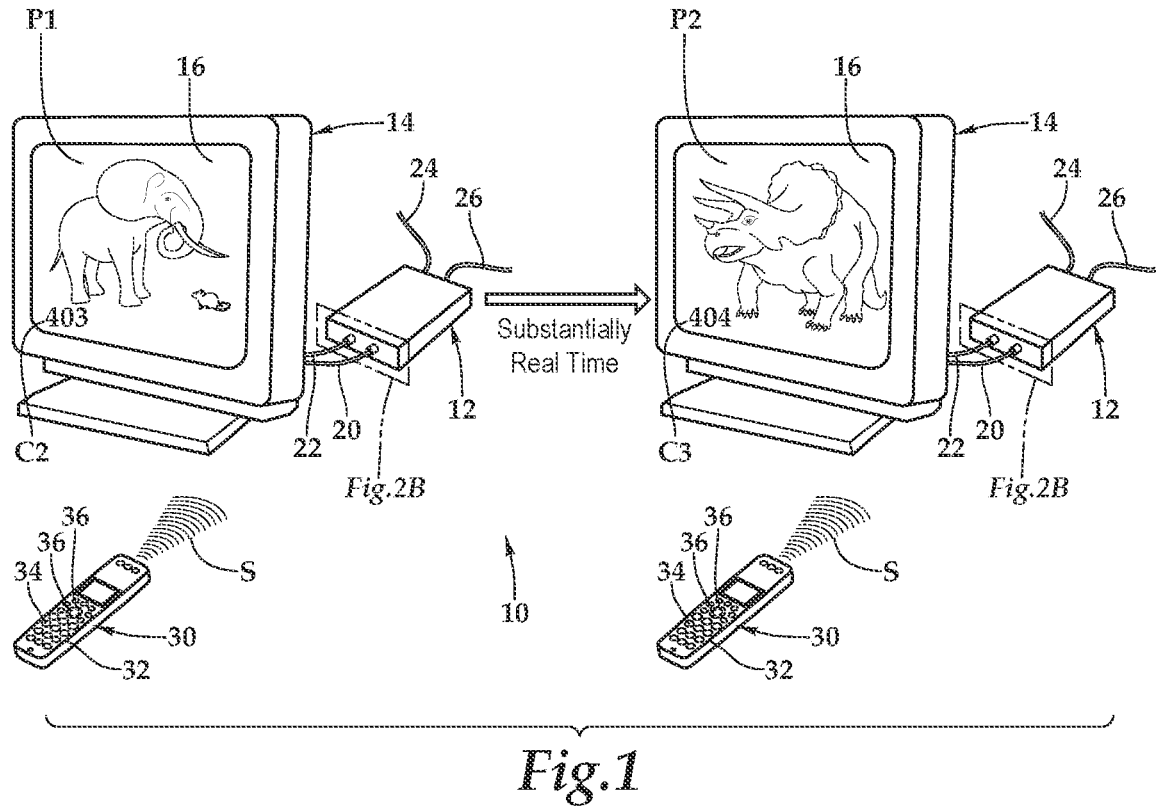
FIG. 1 is schematic diagram depicting one embodiment of a system for changing channels on a television according to the teachings presented herein.

Referring initially to FIGS. 1, therein is depicted one embodiment of system for changing channels, which is schematically illustrated and designated 10. As shown, the system 10 includes a set-top box 12 and a display illustrated as television 14 having a screen 16. A connection, which is depicted as an HDMI connection 20, connects the set-top box 12 to the television 14. Other connections include a power cable 22 coupling the set-top box 12 to a power source, a coaxial cable 24 coupling the set-top box 12 to external cable source, and a category five (Cat 5) cable 26 coupling the set-top box 12 to an external source that is a source internet protocol television signal including multiple channels. It should be appreciated that the cabling connected to the set-top box will depend on the environment and application and the cabling connections presented in FIG. 1 are depicted for illustrative purposes. Further, it should be appreciated that the positioning of the set-top box 12 will vary depending on environment and application and, with certain functionality, the set-top box 12 may be placed more discretely behind the television 14.

A television remote control 30 includes an array of buttons 32 for adjusting various settings such as television channel and volume. Among the array of buttons 32, the television remote control 30 is depicted as including channel change buttons 34, up channel change button 36, and a down channel change button 38. In one embodiment, the television remote control 30 may be a consumer infrared (IR) or other protocol, such as Bluetooth device configured as a small wireless handheld object that issues commands from a distance to the set-top box 12 in order to control the television 14 via the set-top box 12, for example.

In one implementation, as illustrated, channel 403, as indicated by C2, is broadcasting a program, as indicated by P1, and this program P1 is on the screen 16 of the television 14. A user presses the up channel change button 36 on the television remote control 30 and a signal S, which includes instructions for the channel C2 to be changed one channel upward, is transmitted from the television remote control 30 to the set-top box 12. As shown in FIG. 1, the channel is changed from channel 403 to channel 404, as indicated by C3, with program P2. The channel change occurs in substantially real time with zap time being mitigated, as will be discussed in further detail hereinbelow. In one embodiment, the set-top box provides two-way communications with an internet protocol network to buffer and decode video streaming media received on the internet protocol television signal so that zap time is mitigated.

Figure 2A:
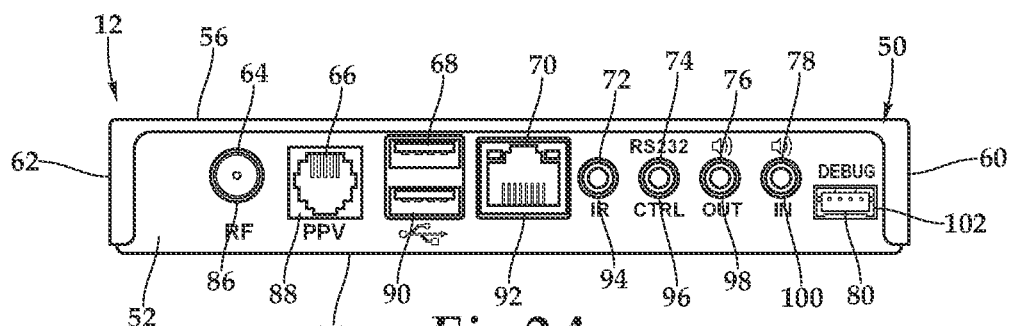
FIG. 2A is a front elevation view of one embodiment of a set-top box depicted in FIG. 1 in further detail.
Figure 2B:
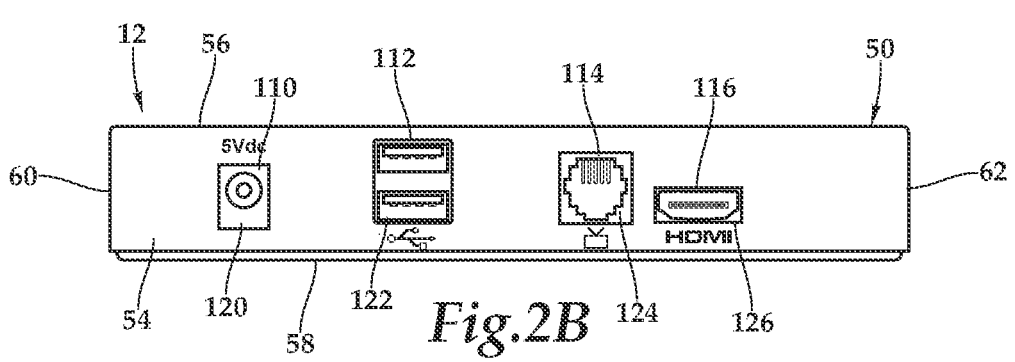
FIG. 2B is a rear elevation view of the set-top box depicted in FIG. 2A.
Figure 3:
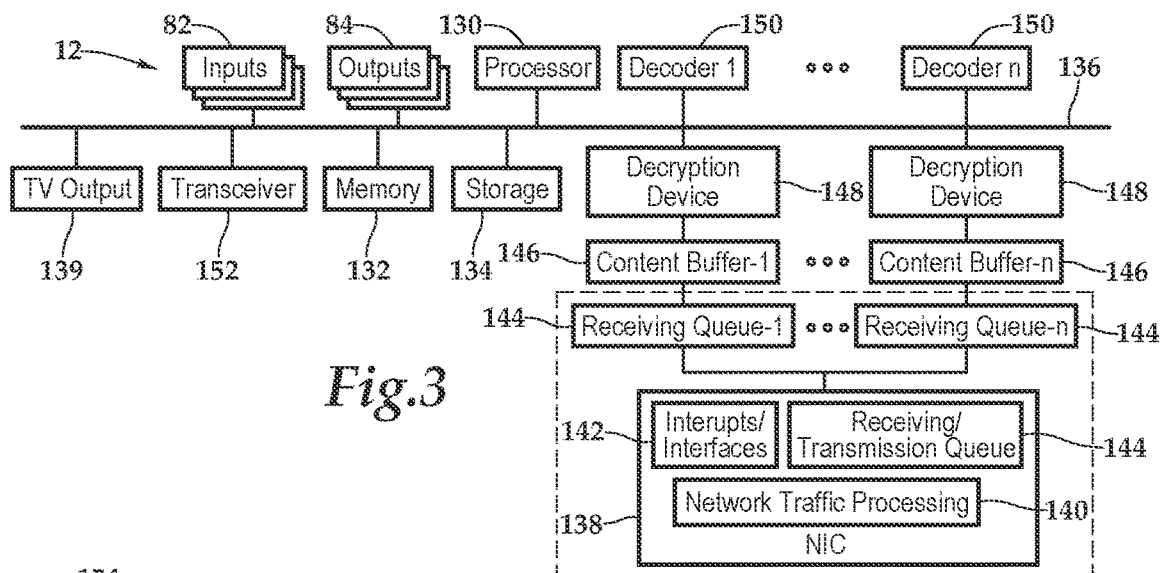
FIG. 3 is a functional block diagram depicting one embodiment of the set-top box presented in FIGS. 2A and 2B.

Referring to FIG. 2A, FIG. 2B, and FIG. 3, as used herein, set-top boxes, back boxes and set-top/back boxes may be discussed set-top back boxes. By way of example, the set-top box 12 may be a set-top unit that is an information appliance device that generally contains set-top box functionality including having a television input via a two-way communication at a network interface controller with an internet protocol network and displays output through a connection to a display or television set and an external source of signal, turning by way of signal preparation the source signal into content in a form that can then be displayed on the television screen or other display device. Such set-top boxes are used in cable television, satellite television, and over-the-air television systems, for example.

The set-top box 12 includes a housing 50 having a rear wall 52, front wall 54, top wall 56, bottom base 58, and two sidewalls 60, 62. It should be appreciated that front wall, rear wall, and side wall are relative terms used for descriptive purposes and the orientation and the nomenclature of the walls may vary depending on application. The front wall includes various ports, ports 64, 66, 68, 70, 72, 74, 76, 78, and 80 that provide interfaces for various interfaces, including inputs and outputs. In one implementation, as illustrated, the ports 64 through 80 include inputs 82 and outputs 84 and, more particularly, an RF input 86, a RJ-45 input 88, universal serial bus (USB) input/outputs 90, an Ethernet category 5 (Cat 5) coupling 92, an internal reset 94, an RS232 control 96, an audio out 98, an audio in 100, and a debug/maintenance port 102. The front wall 54 also includes various inputs 82 and outputs 84. More particularly, ports 110, 112, 114, and 116 include a 5V dc power connection 120, USB inputs/outputs 122, an RJ-45 coupling 124, and an HDMI port 126. It should be appreciated that the configuration of ports may vary with the set-top box depending on application and context.

Within the housing 50, a processor 130, memory 132, storage 134, the inputs 82, and the outputs 84 are interconnected by a bus architecture 136 within a mounting architecture. The processor 130 may process instructions for execution within the computing device, including instructions stored in the memory 132 or in storage 134. The memory 132 stores information within the computing device. In one implementation, the memory 132 is a volatile memory unit or units. In another implementation, the memory 132 is a non-volatile memory unit or units. Storage 134 provides capacity that is capable of providing mass storage for the set-top box 12. Various inputs 82 and outputs 84 provide connections to and from the computing device, wherein the inputs 82 are the signals or data received by the set-top box 12, and the outputs 84 are the signals or data sent from the set-top box 12.

A network interface controller 138 and a television output 139 are also secured in the housing 50 in order to receive content from a source in the hospitality property and forward the content, including external content such video on demand, live programming content, and pre-buffered content, to the television located within the hotel room. More specifically, the network interface controller 138 receives a source internet protocol television signal from an external source. The source signal includes multiple channels and each of the multiple channels has periodic, sequential signal access points that permit tuning initiation. The network interface controller 138 is configured to receive and tune multiple channels from the source internet protocol television signal. As shown, the network interface controller 138 includes network traffic processing 140, interrupts/interfaces 142 and receiving transmission/queues 144. The network controller interface 138 implements the electronic circuitry required to communicate using a specific physical layer and data link layer standard. This provides a base for a full network protocol stack with network traffic processing capabilities, allowing communication with computers or servers on a local area network or large-scale network communications through routable protocols, such as Internet Protocol (IP). The network interface controller may enable communication, either by using cables or wirelessly.

A content buffer 146 associated with a decryption device 148 and a decoder 150 is also included in order to provide at least a partially prepared channel. The contact buffer 146 stores the signal and may be independent storage or associated with or form a portion of the memory 132 or storage 134. In one embodiment, the content buffer 146 may be a first-in-first-out (FIFO) buffer, having one per tuner, in the memory. The content buffer 146 may hold at least one access point for the incurring signal streams when the buffer is assigned to the correct viewing channel, the processor may quickly jump to the access point in the buffer and start the content decryption and decoding process. The decryption device 148 then decrypts the demodulated signal before decoding at the decoder 150. It should be appreciated that although a particular architecture of network interface controller 138, decryption device and decoder is depicted, other architectures are within the teachings presented herein.

A transceiver 152 is associated with the set-top box 12 and communicatively disposed with the bus 136. As shown the transceiver may be internal, external, or a combination thereof to the housing. Further, the transceiver 152 may be a transmitter/receiver, receiver, or an antenna for example. Communication between various amenities in the hotel room and the set-top box 12 may be enabled by a variety of wireless methodologies employed by the transceiver 152, including 802.11, 3G, 4G, Edge, Wi-Fi, ZigBee, near field communications (NFC), Bluetooth low energy and Bluetooth, for example. Also, infrared (IR) may be utilized.

The memory 132 and storage 134 are accessible to the processor 130 and include processor-executable instructions that, when executed, cause the processor 130 to execute a series of operations. In one embodiment, the processor-executable instructions dynamically assign each of the receiving queues (e.g., receiving queue-1 through receiving queue-n) to one of channels. An associated content buffer 146 (e.g., content buffer-1 through content-buffer-n) may likewise also be assigned to one of the channels. The processor-executable instructions provide two-way communications with the internet protocol network communicating with the network interface controller 138 and decode the video streaming media received on the internet protocol television signal. The processor-executable instructions buffer in the content buffer 146 the at least partially prepared second channel signal and track in the content buffer 146 the at least partially prepared second channel signal beginning at a recent periodic, sequential signal access point. In response to receiving a channel change instruction, the buffer is accessed to the at least partially prepared second channel signal beginning at the recent periodic, sequential signal access point. The processor-executable instructions then transform the partially prepared second channel signal to a fully prepared second channel signal and forward, via the television output, the fully prepared second channel signal. Transforming or processing the at least partially prepared channel to be a fully tuned channel may involve use of the decryption device 148 and the decoder 150, for example.

Figure 4A:
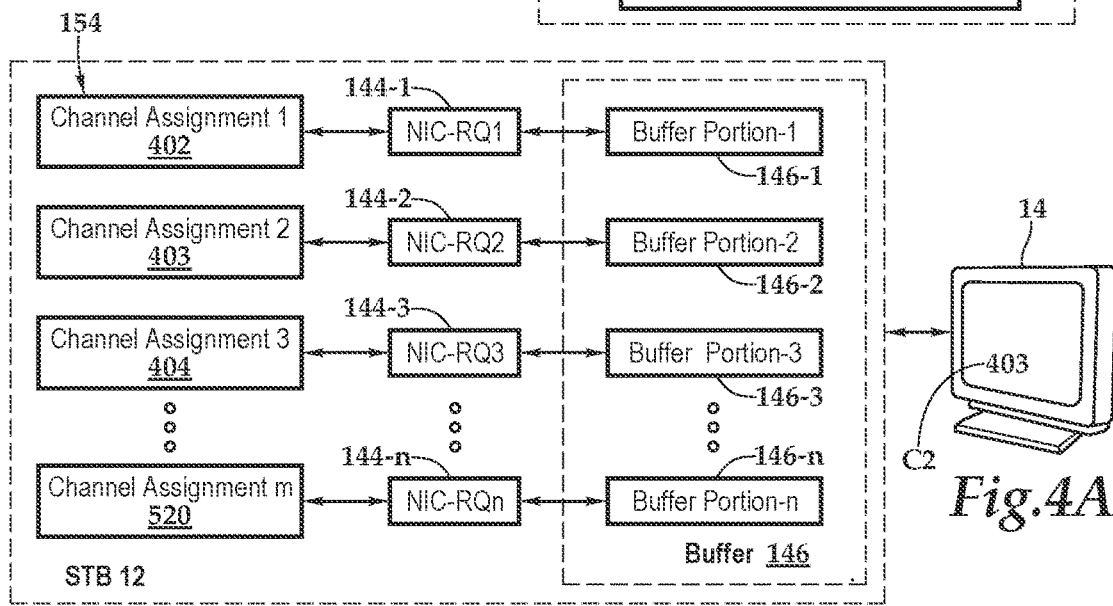
FIG. 4A is a functional block diagram depicting one embodiment of a channel change operation, prior to the channel change.
Figure 4B:
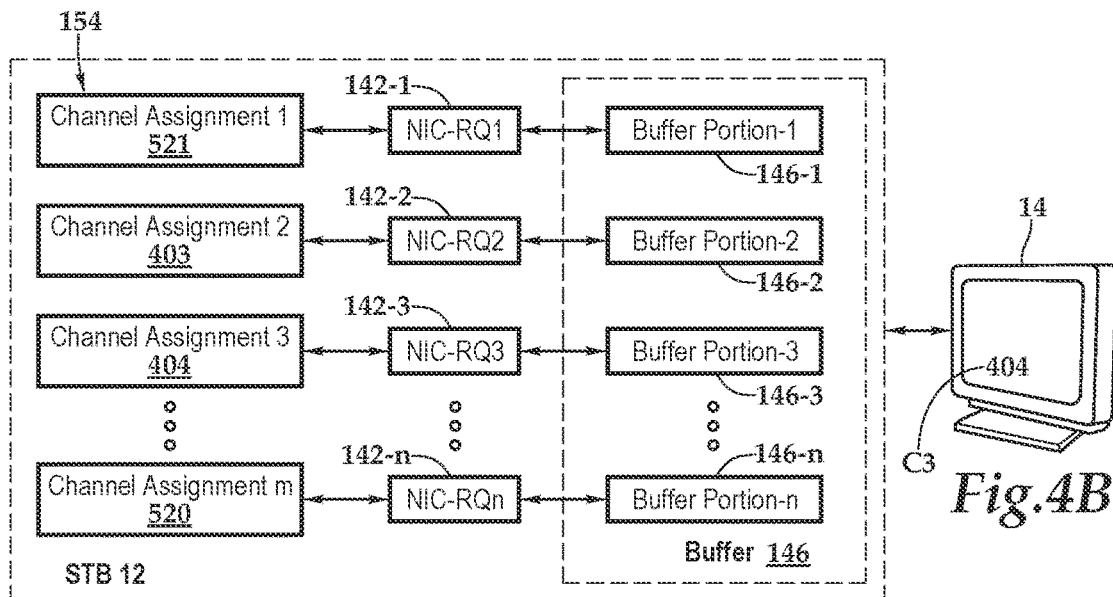
FIG. 4B is a functional block diagram depicting the channel change operation presented in FIG. 4A, at the channel change.

Referring now to FIGS. 4A and 4B, wherein one embodiment of a channel change operation is depicted in additional detail. As shown, in FIG. 4A, channel assignments 154 are made for each receiving queue 144 associated with the network interface controller 138, including NIC-RQ1 (144-1), NIC-RQ2 (144-2), NIC-RQ3 (144-3), through NIC-RQn (144-n). More specifically, the receiving queues 144-1 through 144-n are assigned channels 402, 403, 404, and 520, respectively. It should be appreciated that the number of channels m may be much greater than the number of receiving queues n, such that m>>n. Further, each receiving queue 144 is assigned a buffer portion 146-1, 146-2, 146-3, through 146-n, of content buffer 146. As each tuner receives a channel of the source signal, the channel is at least partially tuned and stored at the respective buffer portion. By way of example, receiving queue-1 is tuned to channel 402 and partially prepares this channel and stores the at least partially prepared channel in buffer portion 1.

As depicted, the television 14 is presently configured for viewing channel 403. At FIG. 4B, the channel is changed from "403" to "404" and, accordingly, the at least partially prepared channel at the buffer portion associated with tuner 3, which is assigned to channel 404 is accessed. The signal is then at least partially prepared or fully prepared and provided to the television 14. By having the channel already partially prepared, the zap time or delay associated with changing channels is minimized.

Figure 5:
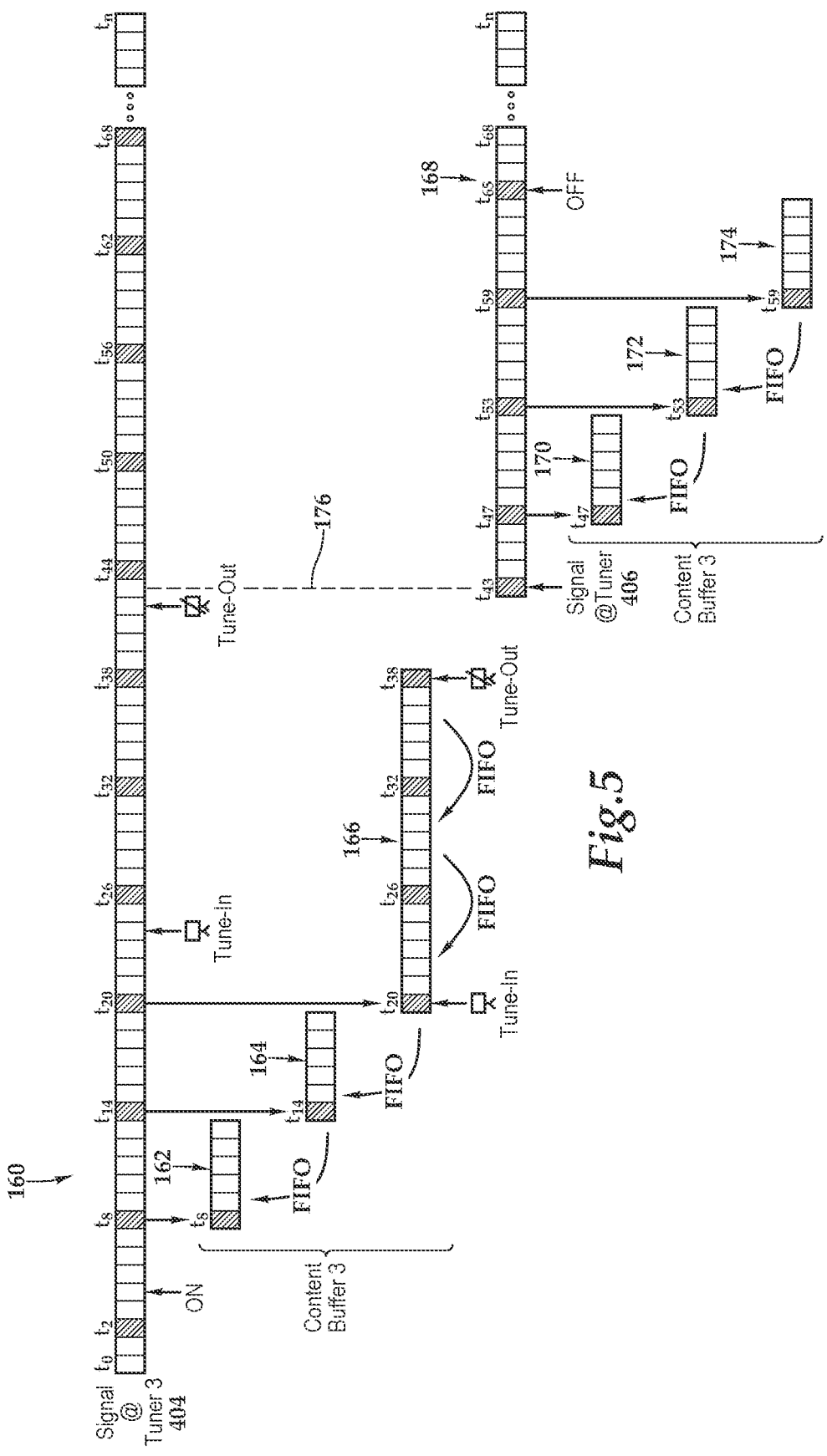
FIG. 5 is a functional block diagram depicting one embodiment of the signal processing and storage allocation accompanying the change operation presented in FIG. 4A and FIG. 4B.

Referring now to FIG. 5, wherein one embodiment of the signal processing and storage allocation accompanying the change operation presented in FIG. 4A and FIG. 4B is further illustrated. A signal 160, which corresponds to channel 404, is receivable by the set-top box and, as shown, begins at time to and continues to time tn. As illustrated, receiving queue 3 receives signal 160 beginning at time $t_4$ upon the television tuning capability being turned ON at the set-top box or television, for example. Periodic, sequential signal access points are positioned within the signal 160 at various times, including $t_2$, $t_8$, $t_{14}$, $t_{20}$, $t_{26}$, $t_{32}$, and continuing with the spacing of 6 second increments between sequential signal access points. As alluded, each of the periodic, sequential signal access points provides a location at which processing and preparation of the signal may begin. Processing and preparation may include receiving, buffering, decryption, and decoding, for example.

With respect to the signal 160, beginning at time $t_8$ with the sequential signal access point thereat, the set-top box buffers in the buffer portion 3 the at least partially tuned channel 160 as signal portion 162 in the buffer portion 3. As shown, in one embodiment, the buffering of the signals occurs in a first-in-first-out (FIFO) manner. As previously discussed, buffer portion 3 continues to keep signal portions, including tacking and identification thereof, beginning at periodic, sequential signal access points until the channel 404 is selected for viewing. By way of example, buffer portion 3 stores a signal portion 164 beginning at time $t_{14}$ and continuing until time $t_{19}$. Further, signal portion 166 is stored in buffer portion 3 beginning with the sequential signal access point at time $t_{20}$ and preliminary preparation performed on the signal portion 166.

The set-top box tracks in the storage and buffering the at least partially prepared channel 160 beginning at a recent periodic, sequential signal access point, such as periodic sequential signal access points $t_8$, $t_{14}$, and $t_{20}$, with the periodic sequential signal access point $t_{20}$ being the recent periodic sequential signal access point upon the set-top box receiving a signal to tune-in to the channel represented by the signal 160 at time $t_{24}$. At time $t_{24}$, the set-top box in response to receiving a channel change instruction, accesses from the buffer portion 3 the at least partially tuned channel 160 beginning at the recent periodic, sequential signal access point at time $t_{20}$. Thereafter, the set-top box transforms the partially tuned channel 160 to a fully tuned channel signal and forwards, via the television output, the fully tuned channel signal to the television.

That is, in the illustrated embodiment, at time $t_{24}$ the set-top box is tuned-in to channel 404. Thereafter, the set-top box accesses the signal portion 166 stored in buffer portion 3 that the set-top box was tracking. At the time $t_{24}$, the set-top box retrieves the partially prepared signal at time $t_{20}$ in the buffer portion 3 and completes the tuning. The set-top box then forwards the fully prepared signal beginning at time $t_{20}$ to the display or television. The set-top box continues to receive and perform a preliminary signal preparation on the signal 160, with storage and buffering of signal portion 166. Further, the set-top box continues to retrieve, perform a secondary signal preparation on the signal portion, and forward the fully prepared signal through time $t_{42}$, which corresponds to time $t_{38}$ in the signal portion 166. At time $t_{42}$, channel 404 is tuned-out, due to a channel change or other event, as indicated by line 176.

As shown, at time $t_{43}$, the buffer portion is assigned to channel 406 and signal 168 is received. Within the signal 168, signal access points are at times $t_{43}$, $t_{47}$, $t_{53}$, $t_{59}$ and so on. Accordingly, signal portions 170, 172, and 174 are sequentially stored, buffered, and preliminary prepared at signal portion 3 in preparation for channel 406 being accessed for viewing by the set-top box. It should be appreciated that although only a single buffer portion is depicted in FIG. 5, multiple buffer portions are within the teachings presented herein and the assignment of channels to the buffer portions may be based various schemes, including storing and pre-preparing the channel corresponding to the "channel-up" button, the "channel-down" button, a channel two "channel-up" button executions away, or a frequently viewed channel, by way of example.

Figure 6:
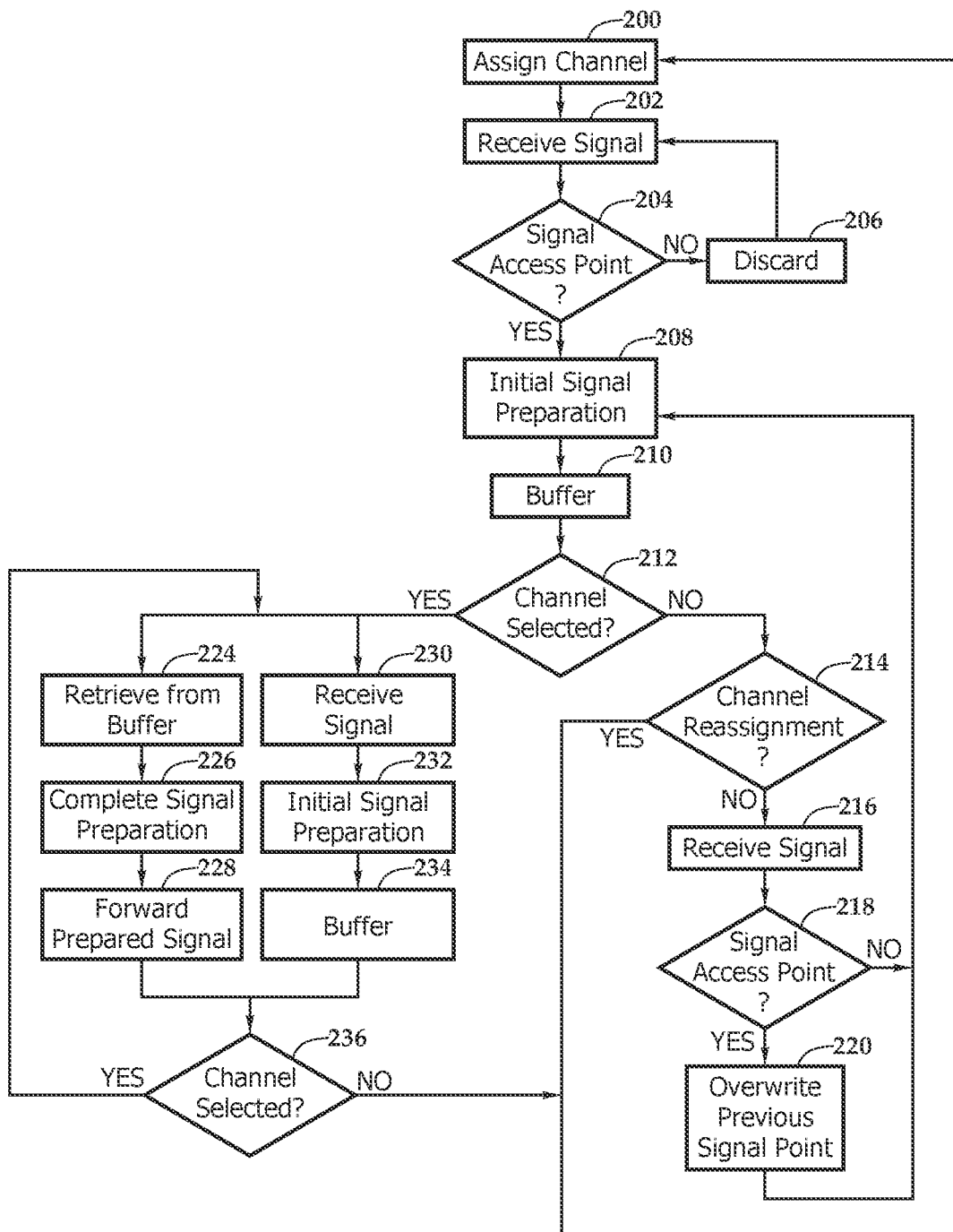
FIG. 6 is a flow chart depicting one embodiment of a method for changing channels according to the teachings presented herein.

FIG. 6 illustrates one embodiment of a method for changing channels according to the teachings presented herein. At block 200, channel assignments are made to buffer portions of the set-top box. Continuing the description of the methodology with respect to a single channel assignment made to a buffer portion of the set-top box, at block 202, the set-top box receives a signal that is assigned for storage and buffer per block 200. At this step, some preparation or processing may occur as well. At decision block 204, if the portion of the signal received is not a signal access point, then at block 206, the signal is discarded and the methodology returns to block 202. On the other hand, if the portion of the signal received includes a signal access point, then the methodology advances to block 208 where initial signal preparation, including primary preparation of the signal may occur. In one implementation, the primary preparation may include a portion of receiving, demodulation, decryption, and decoding. Following the primary preparation, the portion of the signal is buffered in the storage at block 210.

At decision block 212, if the channel is not selected for viewing on the television or display associated with the set-top box, then the methodology advances to decision block 214, where if the storage portion is assigned a new channel, the method returns to block 200. Otherwise, if the storage has not been reassigned a channel, the methodology advances to block 216 where additional signal is received and, if the signal is a signal access point, as shown at decision block 218, then at block 220, the previously stored signal portion associated with the previously most recent signal access point is subject to an overwrite prior to the methodology returning to block 208 to conduct a primary tuning on the signal access point prior to storage.

Returning to decision block 218, if the signal portion received is not a signal access point, then the methodology returns to blocks 208 and 210 to execute primary preparation on the signal portion and store the newly received signal portion with previously received the signal portion or portions associated with the recent signal access point.

Returning to decision block 212, if the channel is selected for display on the television associated with the set-top box, then the methodology advances to two processes conducted in parallel. First, at block 224, the signal is retrieved from buffering so that signal preparation may be completed, including secondary preparation occurring at block 226 following by forwarding of the signal to the television or display at block 228. In one implementation, the secondary preparation may include the portion of receiving, demodulation, decryption, and decoding not performed during the primary tuning. By retrieving utilizing a partially prepared signal to complete tuning, delays associated with zap time are mitigated. In one embodiment, receiving queues and content buffers not used by the viewing channels are fully prepared and receiving demodulated video and audio streamed. The processor continuously tracks the location of each access point in each buffer. In this implementation, decryption does not occur until the content buffer is assigned as the viewing channel.

In parallel to the operations in blocks 224, 226, and 228, at blocks 230, 232, and 234, a signal is received, primary signal preparation occurs, and the signal is buffered. Following the operations in blocks 224-228 and blocks 230-234, the methodology advances to decision block 236, where if the channel remains selected, the methodology returns to blocks 224-228 and blocks 230-234. Otherwise, the methodology returns to the channel assignment at block 200.

The order of execution or performance of the methods and data flows illustrated and described herein is not essential, unless otherwise specified. That is, elements of the methods and data flows may be performed in any order, unless otherwise specified, and that the methods may include more or less elements than those disclosed herein. For example, it is contemplated that executing or performing a particular element before, contemporaneously with, or after another element are all possible sequences of execution.

While this invention has been described with reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. A system for changing channels, the system comprising:
 a programming interface configured to communicate with a network interface controller interconnected to a plurality of receiving queues, each of the plurality of receiving queues having a respective buffer, a respective decryption device, and a respective decoder;
 the network interface controller configured to receive a source internet protocol television signal from an external source, the source internet protocol television signal including a plurality of channels, each of the plurality of channels having periodic, sequential signal access points that permit tuning initiation;
 the network interface controller being associated with non-transitory memory accessible to a processor, the non-transitory memory including first processor-executable instructions that, when executed, by the processor cause the system to:
  receive a plurality of channels simultaneously, each of the plurality of channels of the source internet protocol television signal being assigned to one of the plurality of receiving queues;
  receive and at least partially prepare a first channel from the plurality of channels of the source internet protocol television signal,
  provide an at least partially prepared first channel signal;
  receive and at least partially prepare a second channel from the plurality of channels of the source internet protocol television signal, and provide an at least partially prepared second channel signal; and the non-transitory memory accessible to the processor, the non-transitory memory including second processor-executable instructions that, when executed, cause the system to:
buffer in the buffer the at least partially prepared second channel signal,
track in the buffer the at least partially prepared second channel signal beginning at a recent periodic, sequential signal access point,
in response to receiving a channel change instruction, access from the buffer the at least partially prepared second channel signal beginning at the recent periodic, sequential signal access point, and
transform the partially prepared second channel signal to a fully prepared second channel signal.

2. The system as recited in claim 1, wherein the at least partially prepared second channel signal comprises a fully prepared second channel signal.

3. The system as recited in claim 1, wherein the network interface controller further comprises circuitry providing a full network protocol stack with network traffic processing capabilities.

4. The system as recited in claim 1, wherein the internet protocol television signal further comprises an internet protocol suite over a packet-switched network.

5. The system as recited in claim 1, wherein the first channel comprises video on demand.

6. The system as recited in claim 1, wherein the first channel comprises live programming content.

7. The system as recited in claim 1, wherein the first channel comprises pre-buffered content.

8. The system as recited in claim 1, wherein the network interface controller is dynamically assigned a channel.

9. The system as recited in claim 1, wherein the network interface controller is assigned a channel one channel up from the first channel.

10. The system as recited in claim 1, wherein the network interface controller is assigned a channel frequently tuned.

11. The system as recited in claim 1, wherein the second the system to track in the buffer the prepared second channel beginning at the recent, periodic, sequential signal access point further comprise third processor-executable instructions that, when executed, cause the system to:
track in the buffer the prepared second channel beginning at the most recent sequential signal access point.

12. The system as recited in claim 1, wherein the second processor-executable instructions that, when executed, cause the system to track in the buffer the prepared second channel beginning at the recent, periodic, sequential signal access point further comprise third processor-executable instructions that, when executed, cause the system to:
track in the buffer the prepared second channel beginning at a first periodic, sequential signal access point.

13. The system as recited in claim 1, wherein the second the system to track in the buffer the prepared second channel beginning at the recent, periodic, sequential signal access point further comprise third processor-executable instructions that, when executed, cause the system to:
track in the buffer the prepared second channel beginning at a second periodic, sequential signal access point, the second periodic, sequential signal access point being subsequent in time to the first periodic, sequential signal access point.

14. The system as recited in claim 1, wherein the second processor-executable instructions that, when executed, cause the system to track in the buffer the prepared second channel beginning at the recent, periodic, sequential signal access point further comprise third processor-executable instructions that, when executed, cause the system to:
make available for deletion the portion of the buffered prepared second channel in the buffer previous to the most recent periodic, sequential signal access point.

15. The system as recited in claim 1, wherein the second the system to track in the buffer the prepared second channel beginning at the recent, periodic, sequential signal access point further comprise third processor-executable instructions that, when executed, cause the system to:
make available for over-write the portion of the buffered prepared second channel in the buffer previous to the most recent periodic, sequential signal access point.

16. A system for changing channels, the system comprising:
a programming interface configured to communicate with a network interface controller interconnected to a plurality of receiving queues, each of the plurality of receiving queues having a respective buffer, a respective decryption device, and a respective decoder, the network interface controller including circuitry providing a full network protocol stack with network traffic processing capabilities;
the network interface controller configured to receive a source internet protocol television signal from an external source, the source internet protocol television signal including a plurality of channels, each of the plurality of channels having periodic, sequential signal access points that permit tuning initiation, the internet protocol television signal including an internet protocol suite over a packet-switched network;
the network interface controller being associated with non-transitory memory accessible to a processor, the non-transitory memory including first processor-executable instructions that, when executed, by the processor cause the system to:
receive a plurality of channels simultaneously, each of the plurality of channels of the source internet protocol television signal being assigned to one of the plurality of receiving queues;
receive and at least partially prepare a first channel from the plurality of channels of the source internet protocol television signal,
provide an at least partially prepared first channel signal;
receive and at least partially prepare a second channel from the plurality of channels of the source internet protocol television signal, and
provide an at least partially prepared second channel signal; and
the non-transitory memory accessible to the processor, the non-transitory memory including second processor-executable instructions that, when executed, cause the system to:
buffer in the buffer the at least partially prepared second channel signal,
track in the buffer the at least partially prepared second channel signal beginning at a recent periodic, sequential signal access point,
in response to receiving a channel change instruction, access from the buffer the at least partially prepared second channel signal beginning at the recent periodic, sequential signal access point, and
transform the partially prepared second channel signal to a fully prepared second channel signal.

17. The system as recited in claim 16, wherein the at least partially prepared second channel signal comprises a fully prepared second channel signal.

18. The system as recited in claim 16, wherein the first channel comprises a selection from the group consisting of video on demand, live programming content, and pre-buffered content.

19. A system for changing channels, the system comprising:
- a programming interface configured to communicate with a network interface controller interconnected to a plurality of receiving queues, each of the plurality of receiving queues having a respective buffer, a respective decryption device, and a respective decoder, the network interface controller including circuitry providing a full network protocol stack with network traffic processing capabilities;
- the network interface controller configured to receive a source internet protocol television signal from an external source as video streaming media, the source internet protocol television signal including a plurality of channels, each of the plurality of channels having periodic, sequential signal access points that permit tuning initiation, the internet protocol television signal including an internet protocol suite over a packet-switched network;
- the network interface controller being associated with non-transitory memory accessible to a processor, the non-transitory memory including first processor-executable instructions that, when executed, by the processor cause the system to:
  - receive a plurality of channels simultaneously, each of the plurality of channels of the source internet protocol television signal being assigned to one of the plurality of receiving queues;
  - receive and at least partially prepare a first channel from the plurality of channels of the source internet protocol television signal,
  - provide an at least partially prepared first channel signal;
  - receive and at least partially prepare a second channel from the plurality of channels of the source internet protocol television signal, and
  - provide an at least partially prepared second channel signal; and
- the non-transitory memory accessible to the processor, the non-transitory memory including second processor-executable instructions that, when executed, cause the system to:
  - buffer in the buffer the at least partially
  - track in the buffer the at least partially prepared second channel signal beginning at a recent periodic, sequential signal access point,
  - in response to receiving a channel change instruction, access from the buffer the at least partially prepared second channel signal beginning at the recent periodic, sequential signal access point, and
  - transform the partially prepared second channel signal to a fully prepared second channel signal.

20. The system as recited in claim 19, wherein the video streaming media comprises a selection from the group consisting of video on demand, live programming content, and pre-buffered content.

\* \* \* \* \*

UNITED STATES PATENT AND TRADEMARK OFFICE
CERTIFICATE OF CORRECTION

| | | |
|---|---|---|
| PATENT NO. | : 12,003,815 B2 | Page 1 of 1 |
| APPLICATION NO. | : 18/318571 | |
| DATED | : June 4, 2024 | |
| INVENTOR(S) | : Horton et al. | |

It is certified that error appears in the above-identified patent and that said Letters Patent is hereby corrected as shown below:

In the Claims

Column 9 Claim 11, Line 41, insert --processor-executable instructions that, when executed, cause-- after "second" therefor.

Column 9 Claim 13, Line 56, insert --processor-executable instructions that, when executed, cause-- after "second" therefor.

Column 10 Claim 15, Line 8, insert --processor-executable instructions that, when executed, cause-- after "second" therefor.

Column 10 Claim 16, Line 43, insert --prepared second channel signal,-- after "partially" therefor.

Signed and Sealed this
Sixteenth Day of July, 2024

Katherine Kelly Vidal
*Director of the United States Patent and Trademark Office*